US012347407B2

(12) United States Patent
Poschelk

(10) Patent No.: US 12,347,407 B2
(45) Date of Patent: Jul. 1, 2025

(54) NUT AND STRING TREE FOR A STRINGED MUSICAL INSTRUMENT

(71) Applicant: K K Poschelk Pty Ltd, Queensland (AU)

(72) Inventor: Kevin Poschelk, Queensland (AU)

(73) Assignee: K K Poschelk Pty Ltd, Queensland (AU)

( * ) Notice: Subject to any disclaimer, the term of this patent is extended or adjusted under 35 U.S.C. 154(b) by 583 days.

(21) Appl. No.: 17/640,825

(22) PCT Filed: Sep. 4, 2020

(86) PCT No.: PCT/AU2020/050933
§ 371 (c)(1),
(2) Date: Mar. 6, 2022

(87) PCT Pub. No.: WO2021/042172
PCT Pub. Date: Mar. 11, 2021

(65) Prior Publication Data

US 2022/0319473 A1 Oct. 6, 2022

(30) Foreign Application Priority Data

Sep. 6, 2019 (AU) ................................ 2019903305

(51) Int. Cl.
*G10D 3/12* (2020.01)
*G10D 1/08* (2006.01)
*G10D 3/14* (2020.01)

(52) U.S. Cl.
CPC ................. *G10D 3/12* (2013.01); *G10D 1/08* (2013.01); *G10D 3/14* (2013.01)

(58) Field of Classification Search
CPC .. G10D 3/12; G10D 1/08; G10D 3/14; G10D 3/06
See application file for complete search history.

(56) References Cited

U.S. PATENT DOCUMENTS 2,191,776 A * 2/1940 Schreiber ................. G10D 3/12 84/314 N
4,709,612 A 12/1987 Wilkinson
(Continued)

OTHER PUBLICATIONS

International Search Report and Written Opinion for International Application No. PCT/AU2020/050933 dated Dec. 18, 2020, 10 pages long.

(Continued)

*Primary Examiner* — Kimberly R Lockett

(74) *Attorney, Agent, or Firm* — Fresh IP PLC; Clifford D. Hyra; Aubrey Y Chen

(57) ABSTRACT

A nut for a stringed musical instrument is provided. The nut comprises of a bed that positions and supports a number of bearings over which strings can pass on their way from a bridge of the instrument to the instrument's tuning pegs. The bearings provide a rolling contact with the strings and thereby reduce the friction of the moving string over the nut. The nut can be provided with string capture mechanisms such as grooves, holes or keyhole shaped apertures, along and over the bearings to aid in locking lateral and vertical movements of the strings during play. Further, a string tree for a stringed musical instrument is provided. The string tree comprises bearings which offers rolling contact to the string between the nut and the tuning peg. The string tree increases the angle of approach of the string towards the nut, while the bearings offer reduced friction to the movement of the string over the string tree during the tuning and playing of the instrument.

26 Claims, 13 Drawing Sheets

(56) References Cited

U.S. PATENT DOCUMENTS

| | | | |
|---|---|---|---|
| 5,260,504 | A | 11/1993 | Turner |
| 5,438,901 | A | 8/1995 | Sperzel |

OTHER PUBLICATIONS

International Preliminary Report on Patentability for International Application No. PCT/AU2020/050933 dated Jul. 26, 2021, 14 pages long.

* cited by examiner

NUT AND STRING TREE FOR A STRINGED MUSICAL INSTRUMENT

CROSS REFERENCE TO RELATED APPLICATION

This application is a national phase of International Patent Application No. PCT/AU2020/050933 filed Sep. 4, 2020, which claims the priority filing benefit of Australian Patent Application No. 2019903305 filed Sep. 6, 2019, which are incorporated herein by reference in their entirety.

FIELD OF INVENTION

The present invention relates to a stringed musical instrument. The present invention has particular but not exclusive application as a means to mitigate friction and wearing of strings on a guitar. The invention will be described with reference to a guitar, but this reference is by way of example and the invention is not limited to this application.

BACKGROUND OF THE INVENTION

Conventional guitars comprise a body and neck with strings stretched and tensioned between a distal end of the neck and a bridge mounted on the body. At the distal end, the string tension is adjusted using a tuning peg or machine head tuner. To support and locate the string, a nut is provided close to the tuning peg. The nut is designed to sit on or close to the zero fret position on the machine head end of the fret board. In its simplest form the nut acts as the zero fret and it, together with the bridge at the opposite end of the guitar, hold the strings above the fret wires on the finger board.

When a string is plucked, strummed or percussed, it produces a sound. This sound is the result of the string oscillating between the two fixed points. On a guitar, one fixed point is where the string contacts and breaks free of the bridge and another is where it contacts and breaks away from the nut, or more usually, at a position where the player holds the string in contact with a fret on the neck of the guitar.

The nut is normally fitted into a pre-prepared nut slot. If the strings that extend over the nut are held too high over the first fret, then the string slots of the nut have to be filed to lower the height of these strings. Should the string heights be too low over the first fret, the strings when played will buzz as they vibrate against some of the wire frets along the neck. If the nut is too low, it can be shimmed to a higher level or replaced. Designing, cutting the string slots and shaping the instrument nut requires skill and a lot time.

Nuts are designed to provide minimal resistance to axial string movement because friction often leads to string breakage and increases the string tuning time. For tuning reasons, it is important that the tension in the strings can be quickly equalised on both sides of the nut.

Unfortunately, most nut materials wear with use. As the guitar strings are replaced and repeatedly tuned to pitch using the machine heads or string tuning pegs, the strings are pulled backwards and forwards through a string slot of the nut sawing through or wearing semi-circular grooves deeper into the nut, thereby gradually reducing the height of the string over the first fret and resulting in reduced guitar playability and a compromised guitar sound until the worn nut is replaced.

In an effort to reduce the wear and friction of the strings over the nut, there have been nuts designed to include solid rollers or solid bearing rollers. These nuts however, have had limited success as they are not friction free and tend to gum up easily and stop rolling.

Other problems relating to nut design that can plague guitarists, particularly with mass produced guitars is that the nut grooves are sometimes made too shallow allowing the strings to be easily unseated. One way to prevent this happening is to use captive nuts whereby the strings extending from the bridge are threaded through holes in the nut before they are attached to the tuning machine heads or string peg mechanisms. This type of nut captures the strings and is particularly useful on travel guitars that have folding or detaching necks, as it holds the strings in place over the nut grooves until the neck is re-attached. Restringing guitars with a captive nut can be difficult.

Another alternative is to use string trees on guitars to increase the feed angles of the strings that extend from the tuning pegs or the machine heads to the nut. Increasing the angle of the string as it approaches the nut increases the pressure over the nut. This downward pressure exerted by the string can improve the nut's acoustic characteristics and can help reduce any offensive string buzz associated with the nut. The added string pressure over the nut also helps to keep the strings from being displaced from the grooves of the nut. However, conventional string trees face similar problems with increased friction between the string and the string trees. Further, the added sliding friction of the string trees also act to restrict the movement of the strings as they are being tuned.

OBJECT OF THE INVENTION

It is an object of the present invention to provide a nut for a guitar which can overcome at least in part one or more of the abovementioned problems.

SUMMARY OF THE INVENTION

According to one aspect, the present invention broadly resides in a nut for a musical instrument with a plurality of strings, said nut including one or more bearings, each of said bearings has a casing with a plurality of rolling members; wherein said nut is mountable on the musical instrument at a position where each of the strings contacts the one or more bearings and each of the one or more bearings can rotate in the direction of the longitudinal axis of the strings.

Preferably each of the strings contacts an outer surface of the one or more bearings. More preferably the outer surface is a radial outer surface.

Preferably the strings tensioned across the one or more bearings allows the string to remain in tune and reduces the wear of the string by reducing the friction of the string across the nut. Preferably the tension of the string on either side of the bearing is substantially the same at all times.

Preferably there is one bearing for each string.

Each of said bearings preferably has a casing with an outer smooth surface. In an alternate form, the casing can have an outer surface that has a groove within which to locate a string.

Preferably the rolling members are ball bearings or roller bearing elements that can rotate within the casing. The casing preferably has an outer portion and an inner portion wherein the outer portion can rotate independently of the inner portion because of the rolling ball bearings.

Preferably the inner portion has a central longitudinal aperture for the positioning of a central axle. The central axle is fixable or fixed to the musical instrument.

Preferably the outer portion is rotatable about the central axle. The outer portion can preferably rotate when the string moves so that there is reduced friction of the movement of the string across the outer portion.

Preferably each of the bearings is substantially enclosed to prevent dust and other particulates interfering with the rotational movement of the bearings.

Preferably the bearings and their axles may be made using two or more dissimilar materials, such as metals, plastics and ceramics, with some parts perhaps impregnated with lubricants, designed so that a hard outer casing can rotate independently around an axle, offering a bearing that can offer a substantially friction free performance. Such bearings may be used as an alternative to using ball or roller bearings in the roller nuts.

The nut is preferably positioned on or near the zero fret and between the tuning peg and bridge. Each of the strings of the musical instrument is preferably tensioned between the bridge and the tuning peg while contacting the one or more bearings of the nut.

In the preferred embodiment where there is a plurality of bearings, the position of each of the bearings within the nut can vary to provide each of the strings to pass with a predetermined distance above (height) the first fret.

In one form, the nut is provided with a camber to match a camber of the fret board of the instrument.

The nut can be cambered or flat and the bearings can be spaced apart along the nut's width, length and be at different heights relative to each other while maintaining the predetermined spacing of the tensioned string above the first fret.

The bearings are preferably positioned on the nut at different positions to enable varying of intonation for each individual string.

The nut can include a guide to direct and locate one or more of the strings relative to the bearings. The guides are preferably slots, circular apertures or more preferably enclosed key-hole type apertures.

In one embodiment, a string can be guided with the use of a string tree positioned between the tuning peg and the nut. The string tree preferably includes one or more bearings that rotate along the longitudinal axis of the string and direct the string to the nut causing increased downward pressure of the string on the nut.

The string tree preferably includes one or more bearings that can guide the string to the nut and cause vertical, lateral or other angular pressure on the string.

The string tree preferably includes one or more bearings and can guide one or a plurality of strings to the nut.

The aforementioned string tree can be used with the nut of the present invention or be used independently of the nut of the present invention.

In another aspect the present invention broadly resides in a string tree positioned between the tuning peg and the nut and including one or more bearings over which a string is redirected to increase the angle of the string to the nut thereby increasing the pressure of the string on the nut. Preferably the rotational movement of the bearing on the string tree quickly effects tension change on both sides of the bearing and thereby reduces wear on the string. Preferably the bearings are those described in the first aspect of the invention. The string tree preferably includes one or more bearings that can guide the string to the nut and cause vertical, lateral or other angular pressure on the string. The string tree preferably includes one or more bearings and can guide one or a plurality of strings.

In another aspect the invention broadly resides in a guitar with the aforementioned nut.

In another aspect the invention broadly resides in a guitar with the aforementioned string tree.

The string trees and nuts preferably have casings with pre-lubricated shielded rolling bearings.

The features described with respect to one aspect also apply where applicable to all other aspects of the invention. Furthermore, different combinations of described features are herein described and claimed even when not expressly stated.

BRIEF DESCRIPTION OF THE DRAWINGS

In order that the present invention can be more readily understood reference will now be made to the accompanying drawings which show a preferred embodiment of the invention and wherein.

DETAILED DESCRIPTION OF THE PREFERRED EMBODIMENTS

The present invention will be described herein with reference to guitars. However, the description of the invention with respect of guitars is by way of example and the invention has application to all stringed musical instruments.

Figure 1:
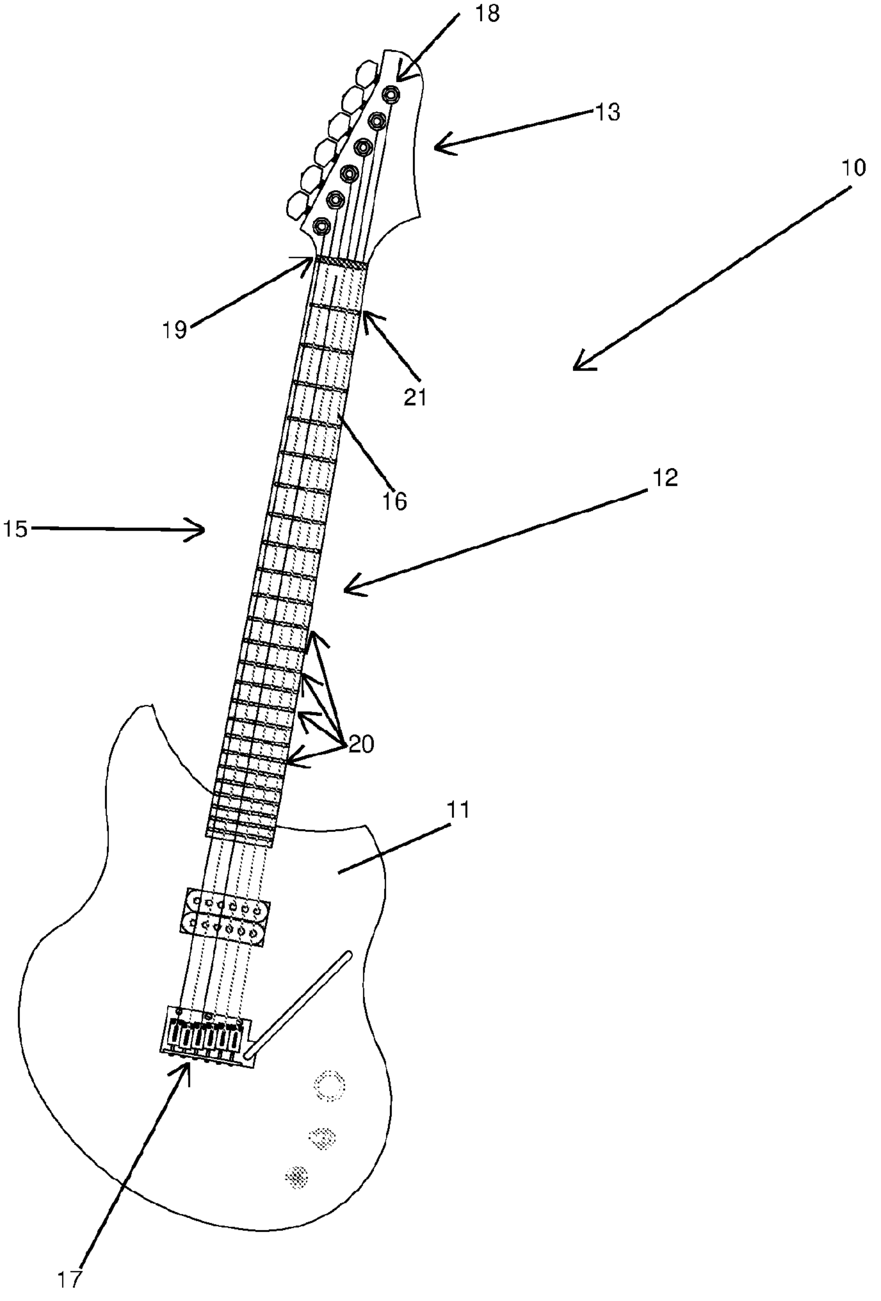
FIG. 1 is an open diagrammatic view of a conventional guitar.

With reference to FIG. 1, there is shown a conventional guitar 10. The guitar 10 has a guitar body 11, guitar neck 12 and guitar head 13. The guitar 10 has a plurality of strings 15, each string 16 is attached to a tuning peg 18. The other end of each of the strings 16 is attached to the bridge 17. A guitar nut 19 is attached onto the neck 12 where it begins to change shape to form the guitar head 13. There is a series of frets 20 transversely arranged on the guitar neck 12. The frets 20 are unevenly spaced apart along the guitar neck 12. The fret 21 which is the fret closest to the guitar nut 19, is the first fret and the guitar nut 19 serves as the zero fret.

Figure 2:
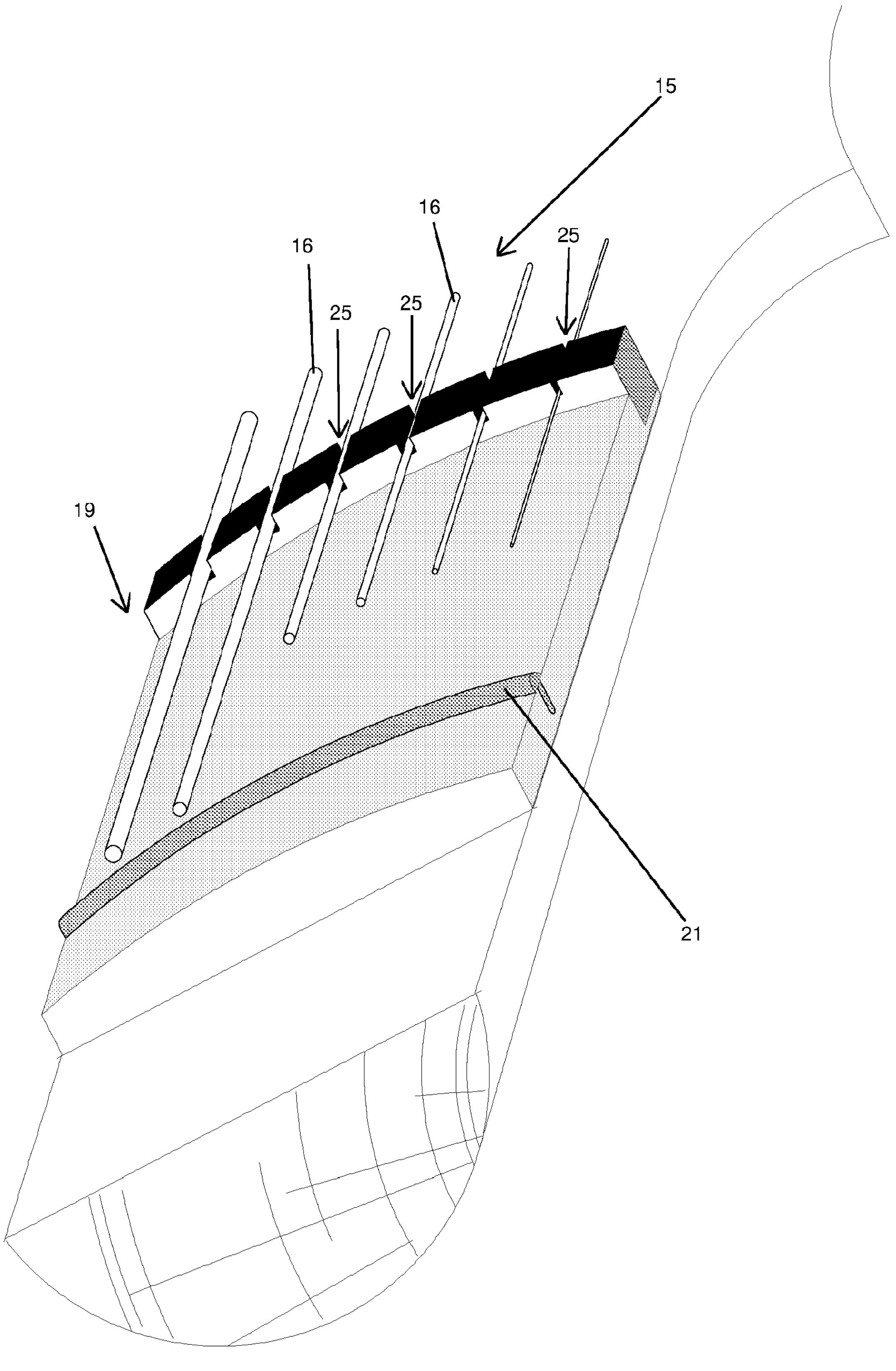
FIG. 2 is a cut-away partial diagrammatic view of a guitar portion with a conventional guitar nut.

The conventional guitar nut 19 is shown in greater detail in FIG. 2. The conventional guitar nut 19 is arcuate or cambered in shape with a series of slots 25 of different widths to retain respective guitar strings 16. The slots 25 serve to position the strings 16 along the guitar neck 12 and guitar body 11 so that each of the strings 16 are positioned at a predetermined height above the frets 20. In a preferred set up, the resting strings 16 are held approximately 0.5 mm above the first fret 21.

Figure 3A:
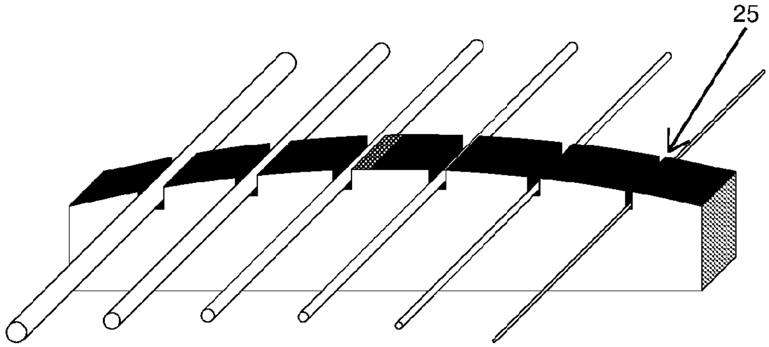
FIGS. 3A, B, C are diagrammatic views of different types of conventional guitar nuts where 3A is a conventional guitar nut, 3B is a conventional captive nut and 3C is a keyhole captive nut which is part of the present invention.
Figure 3B:
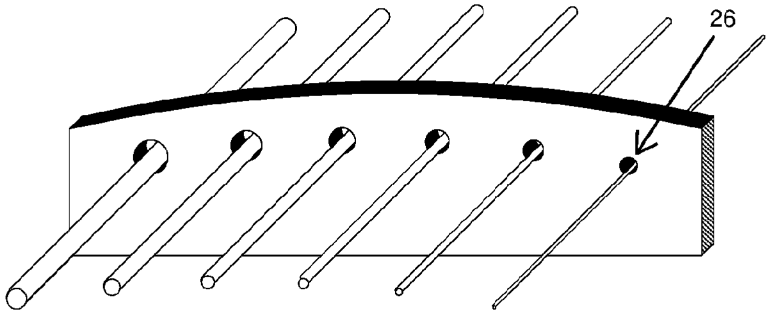
Figure 3C:
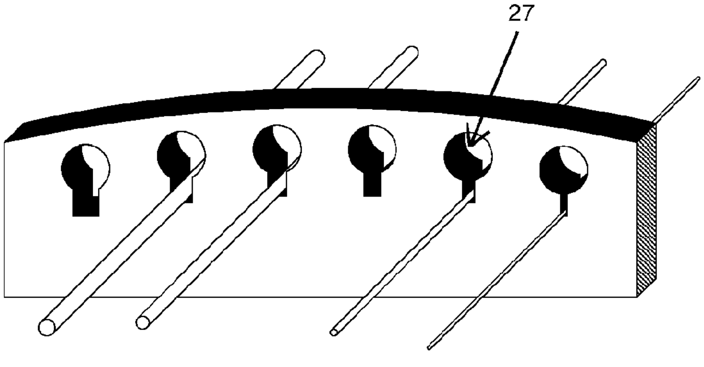
Figure 4A:
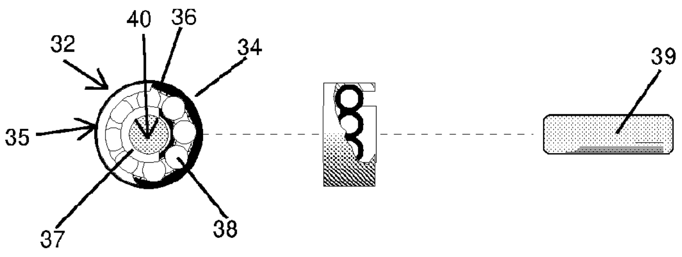
FIGS. 4A, B, C are diagrammatic views of a bearing of the preferred embodiment of the present invention of the guitar nut.
Figure 4B:
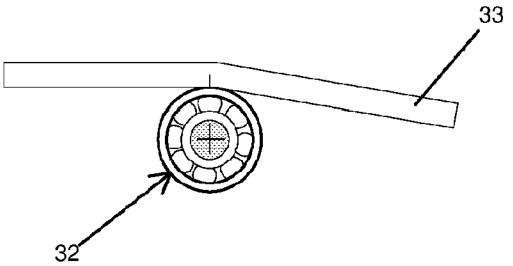
Figure 4C:
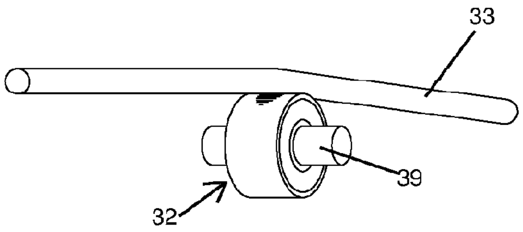

FIGS. 3A, B and C diagrammatically show different ways of retaining the strings 16. FIG. 3A shows a plurality of slots 25 in the conventional guitar nut 19. FIG. 3B shows a plurality of circular apertures 26 in a conventional captive nut. FIG. 3C shows a keyhole captive guitar nut that combines the benefits of both the guitar nuts represented in FIGS. 3A and B with the narrower close-fitting string slots 25 and the string capturing circular apertures 26. The keyhole captive guitar nut shown in FIG. 3C is a nut (and guide) developed as part of the present invention. The keyhole captive guitar nut shown in FIG. 3C is a preferred embodiment of the present invention. The keyhole captive guitar guide (as shown in FIG. 3C) can be used with conventional nuts. Restringing a guitar with a nut that uses string capturing circular apertures 26 is difficult unless the diameters of the circular apertures 26 are much larger than the individual guitar strings 16. However, enlarging diameters of these circular apertures 26 beyond the widths of slots 25 makes the string sit loosely within the nut 19 and may create offending string buzz. The much larger diameter hole of the keyhole aperture allows for much easier threading of the guitar string 16 before it drops automatically into the string slot when the string is being tensioned and tuned to pitch.

In one preferred form, the present invention is a bearing guitar nut 30. The bearing guitar nut 30 has a plurality of bearings 31 positioned within the bearing guitar nut 30. The bearing guitar nut 30 and the positioning of the bearings 32 are shown in FIGS. 4 to 9.

Each of the bearings 32 of the plurality of bearings 31 is positioned to allow a guitar string 33 to contact and move along with the curved outer bearing surface 34 of the bearing 32. The outer bearing surface 34 moves with reduced friction, thereby allowing the guitar string 33 to remain in tune and reduce the amount of wear of both the guitar nut 30 and string 33 caused by the playing action.

Figure 5A:
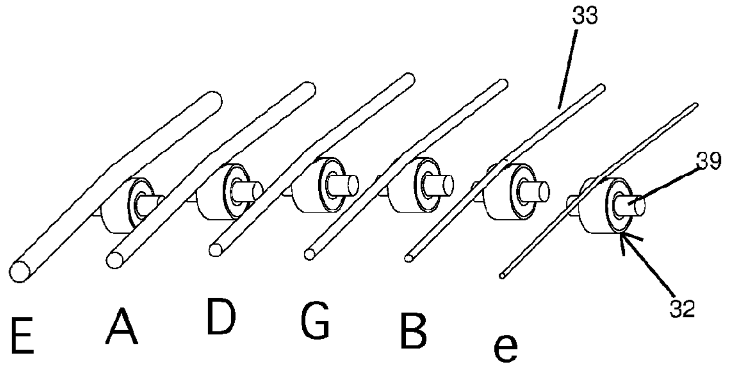
FIGS. 5A, B, C, D, E are diagrammatic views of the arrangement of bearings in the preferred embodiment of the present invention of the guitar nut.
Figure 5B:
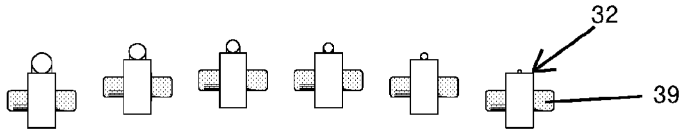
Figure 5C:
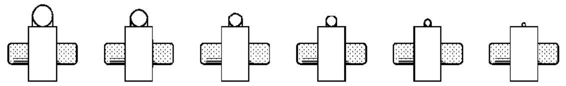
Figure 5D:
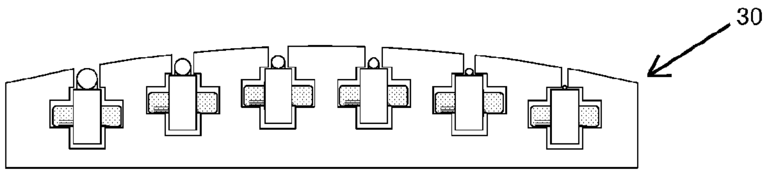
Figure 8:
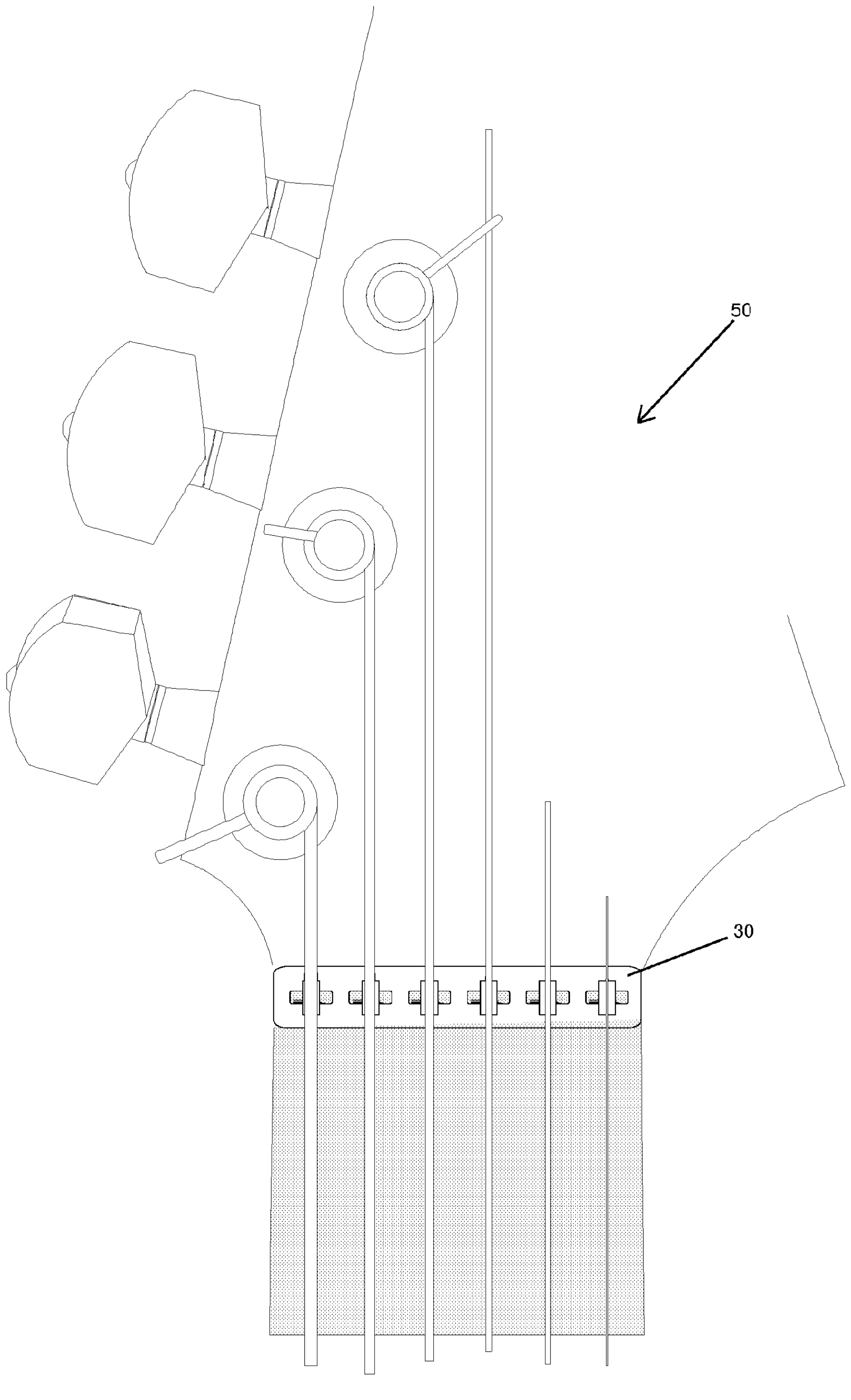
FIG. 8 is a plan diagrammatic partial view of a guitar head showing the preferred embodiment of the present invention of a guitar nut.
Figure 9:
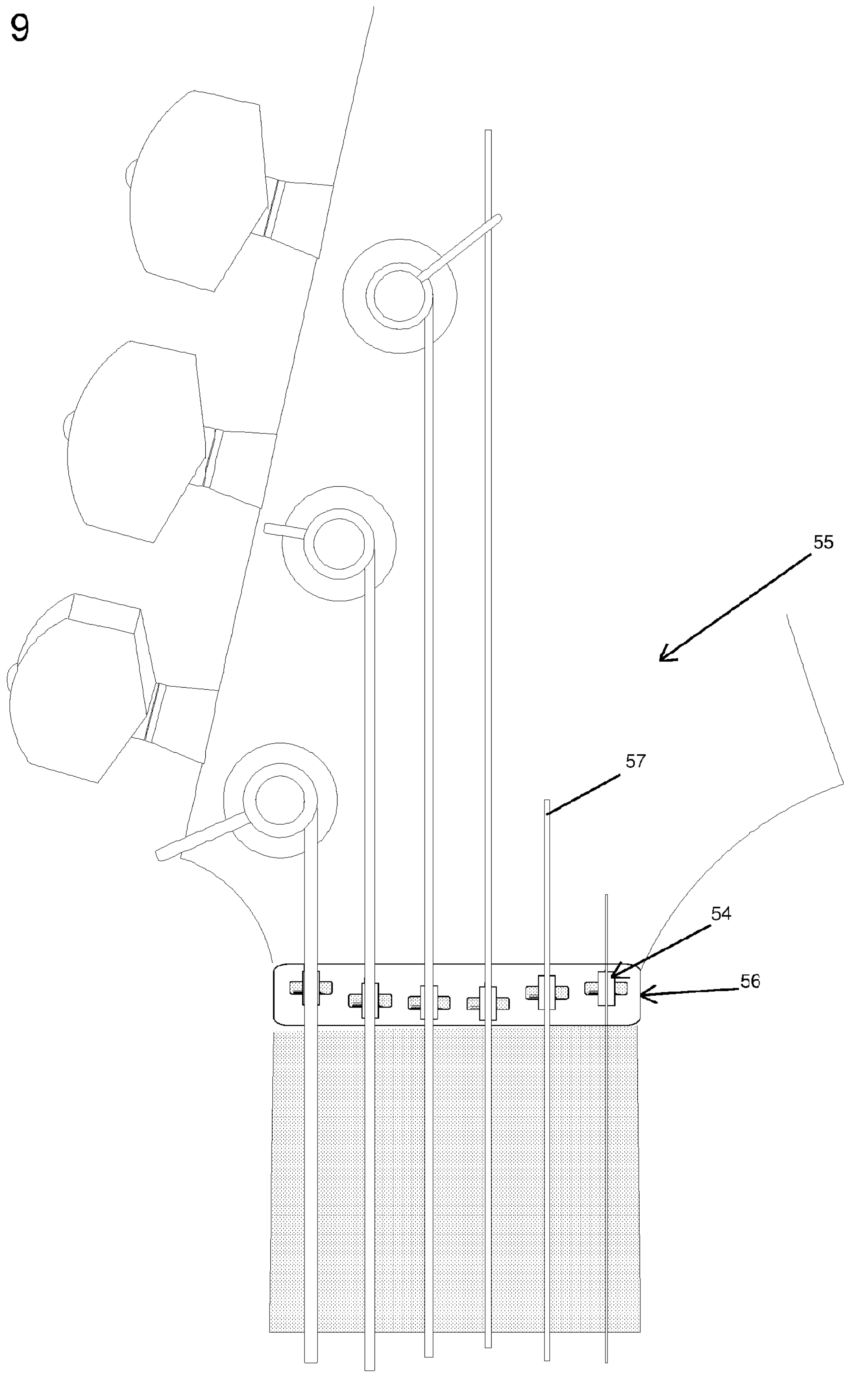
FIG. 9 is a plan diagrammatic partial view of a guitar head showing another preferred embodiment of the present invention of the guitar nut.

Each of the bearings 32 comprises a casing 35 having an outer casing portion 36 and an inner casing portion 37. Within the casing 36, there is a plurality of balls or rollers 38 which can move and enable the outer casing portion 36 to rotate independently of the inner casing portion 37. The outer casing portion 36 rotates independently of the inner casing portion 37 when the guitar string 33 moves along with the outer bearing surface 34. The bearing 32 is positioned within the bearing guitar nut 30 by a transverse axle 39 located within the aperture 40 formed by the inner casing portion 37. The axle 39 is captured within the bearing guitar nut 30. The different position arrangements of the bearings 32 relative to each other are shown in FIGS. 5B and 5C and in diagrammatic plan view in FIGS. 8 and 9. The bearings 32 can be positioned in a straight line across the neck of the guitar as shown in FIG. 5B and FIG. 8 or be in an arcuate or other shapes across the neck of the guitar as shown in FIG. 9. Where the bearings 32 are in an arcuate arrangement or spaced apart from each other with respect to the longitudinal axis of the guitar neck, the vibrating length of the individual strings changes thereby varying the intonation of the individual guitar strings.

Figure 5E:
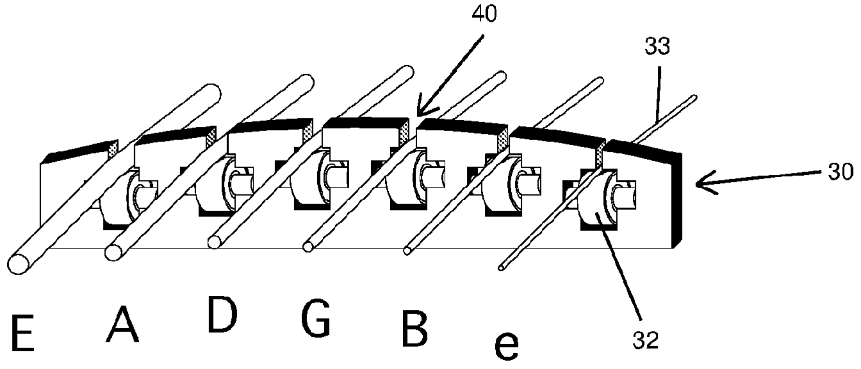
Figure 6:
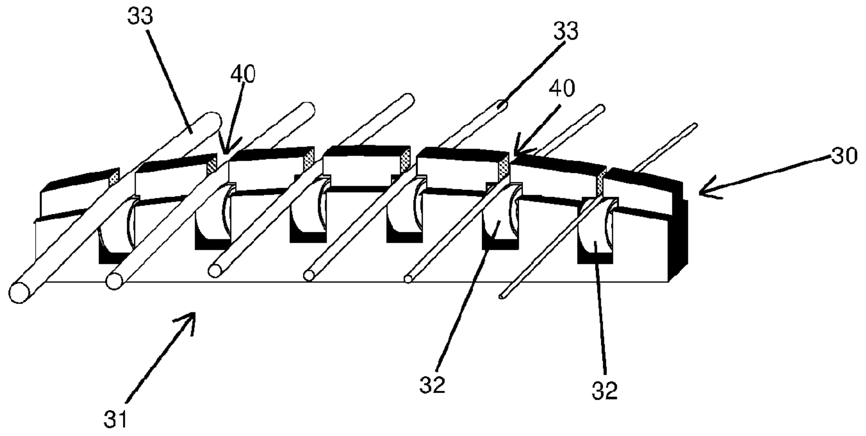
FIG. 6 is a diagrammatic view of the preferred embodiment of the present invention of the guitar nut.
Figure 7:
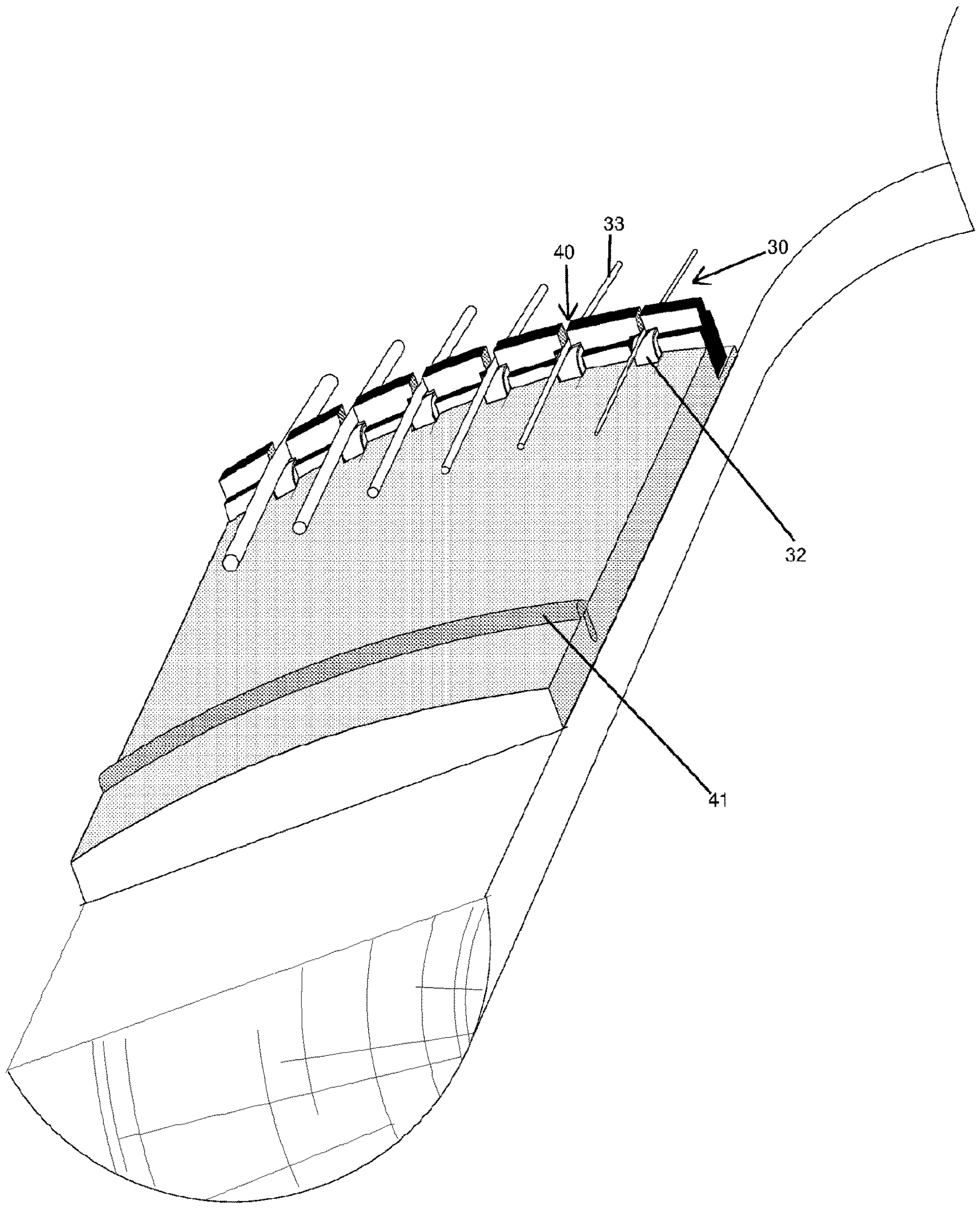
FIG. 7 is a cut-away partial diagrammatic view of a guitar portion with the preferred embodiment of the present invention of the guitar nut.

With reference to FIGS. 6 and 7, there is shown the first preferred embodiment of the bearing guitar nut 30 having a plurality of bearings 31 where each of the bearings 32 are captured at different heights within the guitar nut 30. The bearing guitar nut 30 has a substantially vertical slot 40 associated with each bearing 32, the slots 40 have a width which can accommodate the guitar string 33. Consequently, guitar strings that have a wider diameter are positionable within wider slots 40. With respect to guitars and as shown in FIG. 5E, guitar strings E A D G B e have progressively narrower diameters and corresponding slots for the respective guitar strings will be correspondingly progressively narrower. With particular reference to FIG. 7, there is shown the first fret 41 and each of the strings pass over the first fret 41 at a height of approximately 0.5 mm.

With reference to FIG. 8, there is shown a partial view of the guitar head 50 and bearing guitar nut 30. The bearing guitar nut 30 has the bearings 32 transversely and vertically spaced apart. The view shown in FIG. 8 is a plan view of the bearing guitar nut 30 shown in perspective view in FIG. 7.

With reference to FIG. 9, there is shown a similar guitar head 55 but with an alternate arrangement of bearings 54 on the bearing guitar nut 56. The bearings 54 are spaced apart transversely and longitudinally to effectively change the length of the string 57. This effectively modifies the playing length of the individual strings. This may improve the guitars string intonation to improve to playability of the instrument.

Figure 10:
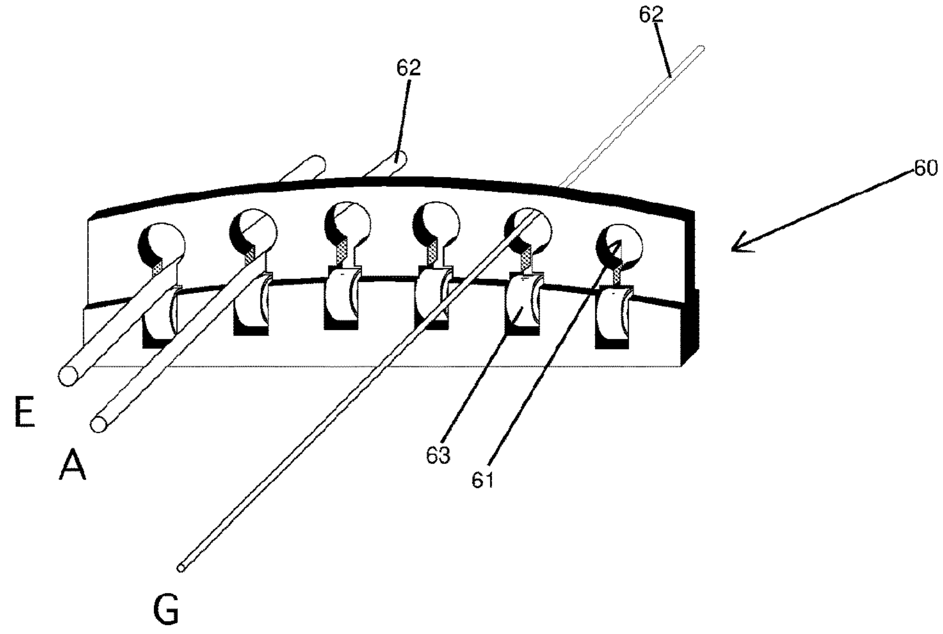
FIG. 10 shows a second preferred embodiment of the invention of the guitar nut.

FIG. 10 shows a second preferred embodiment of the bearing guitar nut 60 having keyhole apertures 61 instead of slots to retain strings 62 and allow them to contact the bearings 63. Keyhole apertures 61 allow easier threading of the strings 62 during restringing and should the guitar be fitted with a folding or detachable neck the strings 62 are still held in close proximately to the bearings 63. When repositioning the neck the strings drop automatically into the slots and regain their contact with the bearings 63.

Figure 11:
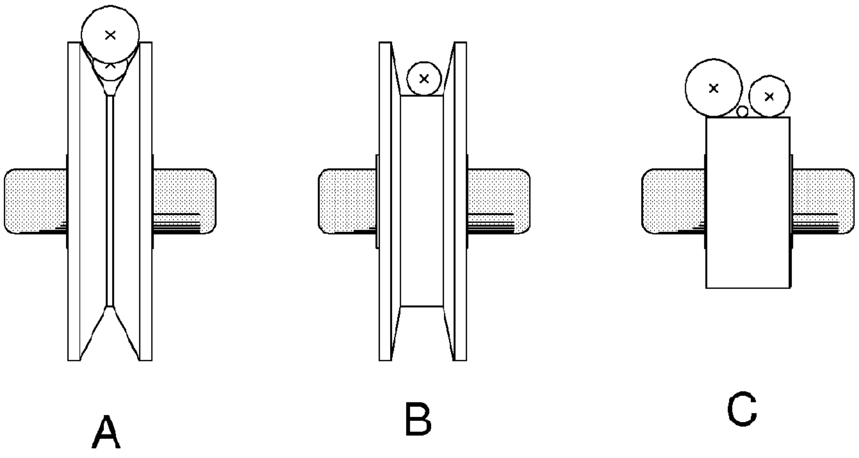
FIGS. 11A, B, C shows diagrammatic views of three different bearings for use in the preferred embodiment of the invention of the guitar nut and string tree.

FIG. 11 shows different configurations of the bearing surface that can be used to make contact with and facilitate the forward and backward movement of the guitar string. FIG. 11A has a V-shaped groove. FIG. 11B has a substantially U-shaped groove whereas FIG. 11C has a flat surface. FIG. 11 C is the flat surface bearing of the preferred embodiment shown in FIG. 6. Strings of different cross-sectional diameters are shown with each of the different bearing surface configurations.

Figure 13:
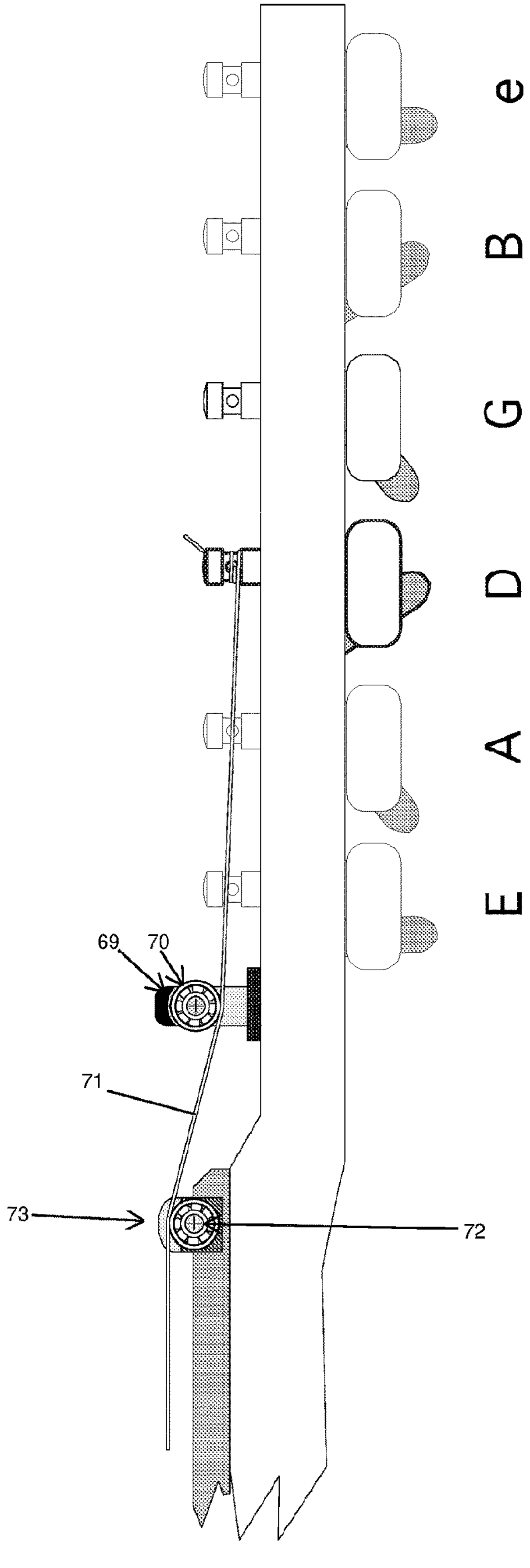
FIG. 13 is a partial diagrammatic view of a guitar head showing a preferred embodiment of the present invention of a string tree.

The bearings as described herein can also be used with guitar string trees to form bearing string trees. A bearing string tree 69 is shown in FIG. 13 directing a guitar string 71 about a bearing 70 on the bearing string tree 69 and across a bearing 72 of the bearing guitar nut 73. The position and angle of the guitar string 71 extending from the bearing 70 directs the guitar string 71 to exert pressure on the bearing 72. Bearing 72 by default becomes the zero fret as the point of contact with the next point of contact being the bridge. The bearing string tree described herein can be used with or without using a bearing guitar nut.

Figure 12:
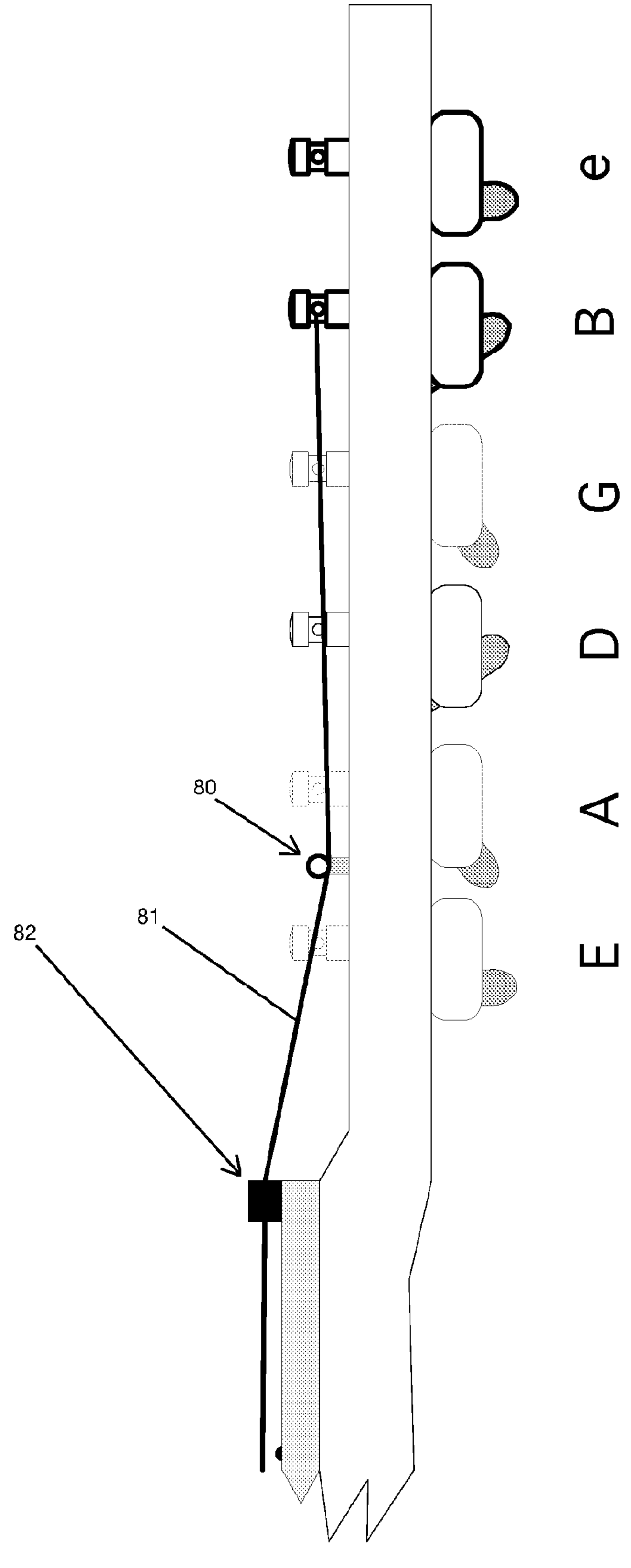
FIG. 12 is a partial diagrammatic view of a guitar head showing a conventional string tree.

In contrast to the bearing string tree 69, a conventional guitar string tree 80 is shown in FIG. 12 where the guitar string 81 is directed around the conventional guitar string tree 80 and across a conventional guitar nut 82. The conventional guitar string tree 80 can produce additional friction at the point of contact of the string 81. This can cause wear of the string 81 as well as cause problems with tuning of the strings 81 as the string tree 80 can also provide resistance to the motion of the string 81 in its axial direction.

Advantages

A preferred embodiment of the present invention provides a nut for mitigating the friction between the string and the nut of a guitar, to assist in keeping the guitar in tune and reduce wearing of the guitar string.

A preferred embodiment of the present invention provides a nut for mitigating wearing of the nut caused by movement of the string.

A preferred embodiment of the present invention provides a nut to reduce bunching-up of strings on either side of the nut.

A preferred embodiment of the present invention provides a string tree to improve positioning of the strings on the nut.

A preferred embodiment of the present invention provides a string tree for mitigating the friction between the string and the string tree, so as to reduce wearing of the guitar string.

VARIATIONS

It will of course be realised that while the foregoing has been given by way of illustrative example of this invention, all such and other modifications and variations thereto as would be apparent to persons skilled in the art are deemed to fall within the broad scope and ambit of this invention as is herein set forth.

Throughout the description and claims this specification the word “comprise” and variations of that word such as “comprises” and “comprising”, are not intended to exclude other additives, components, integers or steps.

The invention claimed is:

1. A nut for a musical instrument with a plurality of strings, said nut including one or more bearings, each of said bearings has a casing with a plurality of rolling members;

the casing has an outer portion and an inner portion wherein the outer portion rotates independently of the inner portion because of the rolling members;

wherein said nut is mountable on the musical instrument at a position where each of the strings contacts the one or more bearings and each of the one or more bearings rotates in a direction of a longitudinal axis of the strings.

2. A nut as claimed in claim 1, wherein each of the strings contacts an outer surface of the one or more bearings.

3. A nut as claimed in claim 1, wherein each of the strings contacts an outer surface of the one or more bearings and the outer surface is a radial outer surface.

4. A nut as claimed in claim 1, wherein the strings tensioned across the one or more bearings allows the string to remain in tune and reduces wear of the string by reducing friction of the string across the nut.

5. A nut as claimed in claim 1, wherein a tension of the string on either side of the bearing is substantially the same at all times.

6. A nut as claimed in claim 1, wherein there is one bearing for each string.

7. A nut as claimed in claim 1, wherein the casing has an outer surface that has a groove within which to locate a string.

8. A nut as claimed in claim 1, wherein the rolling members are ball bearings or roller bearing elements that rotate within the casing.

9. A nut as claimed in claim 1, wherein the outer casing portion has a central longitudinal aperture for the positioning of the inner casing portion that is fixed or fixable to the musical instrument.

10. A nut as claimed in claim 1, wherein the inner portion has a central longitudinal aperture for positioning of a central axle and the central axle is fixable or fixed to the musical instrument.

11. A nut as claimed in claim 1, wherein the outer portion rotates when the string moves so that there is reduced friction of a movement of the string across the outer portion.

12. A nut as claimed in claim 1, wherein each of the bearings is substantially enclosed to prevent dust and other particulates interfering with a rotational movement of the bearings.

13. A nut as claimed in claim 10, wherein the bearings and their axles are made using two or more dissimilar materials, so that a hard outer casing rotates independently around a central axle to provide a substantially friction free performance.

14. A nut as claimed in claim 1, wherein the nut is positioned on or near a zero fret and between a tuning peg and a bridge.

15. A nut as claimed in claim 1, wherein each of the strings of the musical instrument is tensioned between a bridge and a tuning peg while contacting the one or more bearings of the nut.

16. A nut as claimed in claim 1, wherein a position of each of the bearings within the nut varies to provide each of the strings with a predetermined distance above (height) a first fret irrespective of a diameter of the string.

17. A nut as claimed in claim 1, wherein the nut has a camber to match a camber of a fret board of the instrument.

18. A nut as claimed in claim 1, wherein the nut is cambered or flat and the bearings are spaced apart along the nut’s width, length and be at different heights relative to each other while maintaining a predetermined spacing of the tensioned string above the first fret.

19. A nut as claimed in claim 1, wherein the bearings are positioned on the nut at different positions to enable varying of intonation for each individual string.

20. A nut as claimed in claim 1, wherein the nut includes a guide to direct and locate one or more of the strings relative to the bearings.

21. A nut as claimed in claim 20, wherein the guides include slots, circular apertures or more enclosed key-hole type apertures.

22. A nut as claimed in claim 1, wherein a string is guided with use of a string tree positioned between a tuning peg and the nut.

23. A nut as claimed in claim 22, wherein the string tree includes one or more bearings that rotate along a longitudinal axis of the string and direct the string to the nut causing increased downward pressure of the string on the nut.

24. A nut as claimed in claim 22, wherein the string tree includes one or more bearings, each of said bearings has a casing with a plurality of rolling members, the rolling members are ball bearings or roller bearing elements that rotate within the casing.

25. A nut as claimed in claim 22, wherein the string tree includes one or more bearings that guide the string to the nut and cause vertical, lateral or other angular pressure on the string.

26. A nut as claimed in claim 22, wherein the string tree includes one or more bearings and guides one or a plurality of strings to the nut.

* * * * *